United States Patent [19]

Bijen et al.

[11] 4,190,455
[45] Feb. 26, 1980

[54] PROCESS FOR THE MANUFACTURE OF SHAPED PRODUCTS FROM CALCIUM SULPHATE DIHYDRATE

[75] Inventors: Jan M. J. M. Bijen; Peter A. M. Kleinjans, Geleen, both of Netherlands

[73] Assignee: Stamicarbon, B.V., Geleen, Netherlands

[21] Appl. No.: 902,694

[22] Filed: May 4, 1978

Related U.S. Application Data

[63] Continuation-in-part of Ser. No. 900,136, Apr. 26, 1978, abandoned, which is a continuation of Ser. No. 794,928, May 9, 1977, abandoned.

[30] Foreign Application Priority Data

May 8, 1976 [NL] Netherlands .................. 7604948

[51] Int. Cl.$^2$ .................. C04B 7/02; C04B 11/12
[52] U.S. Cl. ............................ 106/98; 106/109
[58] Field of Search .............. 106/97, 98, 109, 110; 264/333

[56] References Cited

U.S. PATENT DOCUMENTS

| | | | |
|---|---|---|---|
| 2,597,370 | 5/1952 | Peckman | 106/98 |
| 2,899,325 | 8/1959 | Kranz et al. | 106/109 |
| 2,918,385 | 12/1959 | Arpin et al. | 106/98 |
| 3,623,898 | 11/1971 | Limberis | 106/110 |
| 3,997,353 | 12/1976 | Chervenka et al. | 106/98 |
| 4,038,094 | 7/1977 | Bondi | 106/110 |

*Primary Examiner*—James Poer
*Attorney, Agent, or Firm*—Cushman, Darby & Cushman

[57] ABSTRACT

A method for the controlled manufacture of shaped products by compressing a mixture of calcium sulphate dihydrate, hydraulic cement, water and particulate silicious inorganic materials such as sand or porous inorganic materials. The manufacture is controlled to obtain a shaped product having a predetermined crushing strength in accordance with a described relationship between such predetermined crushing strength, the amount of silicious inorganic particulate material present in the mixture and the pressure exerted on the mixture during the formation of the shaped products.

14 Claims, No Drawings

PROCESS FOR THE MANUFACTURE OF SHAPED PRODUCTS FROM CALCIUM SULPHATE DIHYDRATE

This application is a continuation-in-part of U.S. application. Ser. No. 900, 136 filed Apr. 26, 1978, now abandoned which is in turn a continuation of U.S. application Ser. No. 794,928 filed May 9, 1977, now abandoned, the entire disclosure of which is hereby incorporated by reference.

BACKGROUND OF THE INVENTION

The present invention relates to a process for the manufacture of shaped products by the compression of a wet mixture of calcium sulphate dihydrate, cement, water and particulate inorganic materials such as sand.

A process for the manufacture of shaped products by compression of calcium sulphate dihydrate ($CaSO_4 \cdot 2H_2O$) is disclosed in the published Netherlands patent application No. 7410706. The calcium sulphate may be in the form of chemical gypsum obtained from the chemical industry, for example as a by-product in the preparation of phosphoric acid or natural gypsum. It has also been found that shaped articles can be made by compressing calcium sulphate dihydrate together with known additives such as calcined gypsum ($CaSO_4 \cdot \frac{1}{2}H_2O$), anhydrite ($CaSO_4$) and lime, or other binding materials. However, until now the manufacture of shaped products by compression of such mixtures has not yielded completely satisfactory results. One or more of the following disadvantages have been experienced:

(1) The process has been uneconomical because very high pressures, in the order of 400 kg/cm², must be used to form a shaped product having only a crushing strength of around 150 kg/cm², which is generally required to form "bricks" from calcium sulphate dihydrate for load-bearing structures. As used herein, the term crushing strength means the pressure in kg/cm² on two opposed sides of the shaped product at which fracture of the shaped product occurs. The presses normally used for forming shaped products do not produce this high a pressure, and presses which are capable of producing such high pressures are not economical to use in a process for the manufacture of shaped products from calcium sulphate dihydrate.

(2) The cost of manufacturing a shaped product from calcium sulphate dihydrate is a function of the cost of the components of the calcium sulphate dihydrate mixture to be compressed, and the cost of the compression itself. Previously the optimum relationship between the components of the mixture and the pressure to be applied to obtain a desired crushing strength has been unknown.

(3) It has not been possible to economically utilize the wet gypsum from the chemical industry, such as from the preparation of phosphoric acid, unless thermal drying is applied, or large quantities of cement, dry calcium sulphate hemihydrate or dry anhydrite and lime are added. It is apparent that these measures are costly, and tend to make the use of wet gypsum uneconomical.

(4) In most instances, such mixtures were difficult to process in a compressing process step.

SUMMARY OF THE INVENTION

The present invention provides a method for the manufacture of shaped products from mixtures of calcium sulphate dihydrate, cement and a particulate inorganic material such as sand, which method is more convenient and economical than that described above.

It is an object of the present invention to provide a method for the controlled manufacture of shaped products having a predetermined crushing strength in accordance with a described relationship between such predetermined crushing strength, the amount of particulate inorganic material present in the mixture, and the pressure exerted on such mixture during the formation of the shaped products.

It is a further object of the present invention to manufacture shaped products from mixtures of wet calcium sulphate dihydrate, cement and a particulate inorganic material according to a described relationship which makes it possible to choose an optimum combination of the cost of the components of the mixture and the pressure to be applied to form shaped products having a predetermined desired crushing strength.

Another object of the present invention is to provide a method for the manufacture of shaped products from mixtures of wet calcium sulphate dihydrate as main constituent, which are easy to handle in a compressing process.

Finally, another object of the present invention is to provide a process for the manufacture of shaped products from wet calcium sulphate dihydrate which does not require either thermal drying or the addition of large quantities of cement, calcined gypsum, dry anhydrite and or lime.

DETAILED DESCRIPTION OF THE INVENTION

In our earlier application Ser. No. 794,928 filed May 9, 1977, we disclosed that the above mentioned disadvantages could be overcome by mixing sand or other particulate inorganic material with the wet calcium sulphate dihydrate and compressing the mixture into shaped products. The relationship between the compression pressure P (in kg/cm²) to be applied in forming the shaped products and the content of sand or other particulate inorganic material (S expressed as a percent by weight of the dry weight of calcium sulphate dihydrate) is selected in accordance with the formula:

$$P = 0.06(60-A)^2 + 90 \text{ to } P = 0.12(60-S)^2 + 90$$

The mixture of calcium sulphate dihydrate and sand or other particulate inorganic material also contains from about 8 to 15 percent by weight of cement, (as a percentage of the total dry weight of the mixture of dry calcium sulphate dihydrate and sand or other particulate inorganic material), and water in an amount between about 5 and 20 percent by weight of the total mixture.

When produced in accordance with such method, the shaped products have a crushing strength D of between about 135 and 165 kg/cm² (after being allowed to condition for at least one day after compression in a relative humidity of between about 75 and 100 percent). This relationship is most applicable to mixtures having a sand or other particulate inorganic material content of from about 25 to 35 percent by weight (as a percentage of the dry calcium sulphate dihydrate) which, in accordance with the formula, would require compression pressures obtained using normally available presses. Moreover it is very surprising that with an increasing amount of sand the compression pressure may be lowered to obtain said crushing strength. The sand has thus not to be considered as being a filler material as such.

However the above relationship restricts the range within which the process can be applied. Specifically, it may be desired to manufacture shaped products having a significantly lower or higher strength, or to apply substantially different compression pressures. It has now been found a more complex relationship between the crushing strength (D), pressure (P), and content of sand or other suitable particulate inorganic material (S), which gives a far greater degree of flexibility with respect to each of these parameters, and defines the optimum combination of these parameters to obtain shaped products having a desired predetermined crushing strength according to the standards required, at the lowest cost. Furthermore, this new relationship permits the controlled manufacture of shaped products whereby a predetermined crushing strength can be obtained within 10 percent of the desired value.

Specifically, it has been found that if a specific value of crushing strength D ($kg/cm^2$) is predetermined for example according to existing standards, the pressure P to be applied ($kg/cm^2$) and the content of sand or other particulate inorganic material S (expressed as a percent by weight of the dry calcium sulphate dihydrate and sand) can be determined by the relationship:

$$D = 2.6 \times 10^3 (100 - S)^{-1.2} \times P^{0.43}$$

Using this formula, it is thus possible to control the manufacture of shaped products in order to obtain shaped products having a crushing strength within plus or minus 10 percent of the crushing strength D calculated in accordance with such formula. In this way it is possible to optimize the combination of pressure P and the content of sand or other particulate inorganic material S so as to obtain the lowest cost product having the fixed crushing strength. The crushing strength actually obtained may vary within about plus or minus 10 percent of the crushing strength D calculated according to the formula, depending upon the amount of cement and water in the initial mixture before compression.

Alternatively, if a press of a particular pressure capability is available, the optimum S content can be determined for a fixed D. Or if a mixture having a certain S content is to be used, the optimum P can be determined by the above formula for a desired D. The S-content may be determined by certain additional factors such as the availability of the material, or the required maximum radio-active radiation of the end product. Chemical gypsum obtained as by-product from the chemical industry normally shows radio-active radiation over the maximum value allowed.

The content of sand or other particulate inorganic silicious material in the mixture to be compressed should be at least as high as 20 percent and may be even as high as 70 percent of the combined dry weight of calcium sulphate dihydrate and sand present in the mixture. Even at this high content, which is nearly equal to the content of gypsum, reasonably strong shaped products such as bricks can be produced at low pressures, suitable for interior walls, and extraordinarily strong bricks, suitable for load-bearing structures, can be produced at higher pressures. However, a content of sand or other particulate inorganic material of from about 20 to 70 percent by weight as defined above, in combination with a pressure of from about 100 to 350 $kg/cm^2$ is preferably applied. This pressure allows use of all presses normally available and employed in the industry for producing sand-lime bricks. Most preferably a sand or other particulate inorganic silicious material content of between about 20 to 40 percent, in combination with a pressure of between about 50 and 100 $kg/cm^2$, is applied. However, it should be apparent that other presses and other pressures, such as from about 50 to 500 $kg/cm^2$, can be used as well.

Preferably a relatively coarse sand or other particulate inorganic material is used, having a grain size which may range up to approximately 4 millimeters and containing no more than about 10 percent by weight of particles of having a grain size smaller than 250 microns. However, other gradings or grain size distributions may also be used in the method of this invention. The particulate inorganic material utilized is preferably sand and/or an expanded inorganic particulate material such as thermally expanded clay, expanded shale, expanded mica (perlite), or pumice. However other types of porous or non-porous materials may also be used having a crushing-strength equal or higher than the applied pressure. The constituents of non-porous sand may be any inorganic silicious material.

The hydraulic cement content of the mixture should be within the range of from about 8 to 15 percent by weight of the combined dry weight of calcium sulphate dihydrate and sand or other particulate inorganic material present in the mixture. Using a higher amount of cement unnecessarily increases the cost of the shaped products, and furthermore may result in the troublesome formation of ettringite, which causes cracking of the shaped products. On the other hand, using a lesser amount of cement leads to shaped products of insufficient strength. Preferably, from both a structural and economic point of view, the cement content of the mixture to be compressed will be within the range of from about 10 to 13 percent by weight.

The use of the term cement herein should be understood to mean any type of hydraulic cement, principally Portland cement and aluminous cement, and most preferably Portland cement B, because of its fast setting time.

The mixture to be compressed may also optionally contain a minor quantity of other known additives such as pigments, fungicides, workability promoters, efflorescence suppressing agents and the like. Such additives, although not important to the workability of the invention disclosed herein may be present in the mixture in a total quantity preferably not exceeding 5 percent by weight based on the dry weight of the mixture.

Water is generally introduced into the mixture along with the wet calcium sulphate dihydrate, such as from the chemical industry (preferably after having been at least partially reduced in water content by filtration, centrifuging or air-drying), or from wet sand or a combination of both. The amount of water present in the mixture to be compressed should be at least sufficient to insure the reaction and the binding of the quantity of cement present in the mixture, but not so much that would prevent the mixture from being compressed. Generally the minimum amount of water in the mixture will be about 5 percent by weight of the total mixture. The maximum amount of water in the mixture will preferably not exceed about 20 percent where the particulate inorganic material is non-porous, such as sand.

However it has been found that if porous particulate inorganic materials with an open pore structure are used, the amount of free water present in the mixture can be well in excess of 20 percent by weight without objection, and even up to about 50 percent by weight related to the dry components. Thus where at least a portion of the particulate inorganic material has an open pore structure, excess free water present in the mixture can be taken up by this porous material. This is particularly advantageous when utilizing the relatively wet gypsum resulting from the chemical industry, because it can be economically used in the present method without the necessity of costly thermal drying, or the addition of large quantities of cement, calcined gypsum, dry anhydrite or lime.

The quantity of such porous material to be used in place of non-porous particulate materials such as sand is determined by the degree of porosity of the porous material and the quantity of water present in the mixture in excess of 20 percent by weight. For example, if the water content of the mixture to be compressed is 30 percent by weight, at least 10 of those percent (that is ⅓ of the water) must be taken up by the porous inorganic material. If the porosity of this material is 50 percent, then the portion of the inorganic material made up of such porous material should constitute at least approximately 20 percent by weight of the total mixture to be compressed. There is no objection to the entire particulate inorganic material being such a porous material, provided that there remains in the mixture sufficient free water, not taken up by the porous material, for binding the cement present.

The gypsum utilized in the present invention may be either calcium sulphate dihydrate resulting as a by-product from the chemical industry, such as in the preparation of phosphoric acid, or may be natural gypsum.

Shaped product produced in accordance with the method above described will generally have a crushing strength within the range of between about 50 and 300 kg/cm$^2$, preferably at least about 100 kg/cm$^2$, and will be comprised of from about 30 to 80 percent by weight calcium sulphate dihydrate, from about 20 to 70 percent by weight particulate inorganic material such as sand, from about 8 to 15 percent by weight of hydrated cement (calculated as dry cement), and up to a maximum of about 5 percent by weight of other additives, all relative to dry gypsum and sand. The shaped products so produced will have a higher water resistance than similar shaped gypsum products without sand and cement or made in accordance with the prior art from calcium sulphate hemihydrate by the pouring method. The products produced in accordance with the method of the present invention show no noticeable decrease in crushing strength even when subjected to an atmosphere having a relative humidity of 100 percent.

It has furthermore been found that by conditioning the shaped products by the method of the present invention for some period of time, such as a week, a slight further improvement in the crushing strength can be achieved. This conditioning can be carried out at ambient room temperature, pressure and humidity, or the period of conditioning may be shortened by treating the shaped products in an autoclave, but at such pressure and temperature that no calcium sulphate hemihydrate will be formed.

The invention will now be described in connection with the following examples, which it will be understood are intended to be illustrative, and not to limit the invention to the scope of the examples described.

EXAMPLE I

Five mixtures were made from wet calcium sulphate dihydrate, sand and hydraulic cement. The calcium sulphate dihydrate was obtained as a by-product in the preparation of phosphoric acid. The free water content of each mixture was 16 percent by weight. The sand content (S) of the mixtures were, respectively, 0, 10, 20, 30 and 40 percent of the weight of dry calcium sulphate dihydrate and sand contained in the mixture. The sand used was standard sand which is normally used for standarized mortar tests. In all cases, the cement (Portland cement B) content was 12.5 percent of the total dry weight of calcium sulphate dihydrate and sand. These mixtures were used to make shaped products, measuring 20×10×5 cm, by application of various pressures (P).

The crushing strength of each of the shaped products thus produced was measured, and the following experimental values were determined: 0110

According to the table if the crushing strength D is fixed at 150 kg/cm$^2$ and the available compression pressure will be 100 kg/cm$^2$, a sand content of 40% relative to the dry gypsum and sand is required.

The free water content of the shaped products after compression was 4.5 percent by weight, and after conditioning for one week, the free water content had fallen to 3 percent by weight.

EXAMPLE II

A mixture was made of calcium sulphate dihydrate, 10 percent by weight sand and 15 percent by weight pumice (both expressed as a percentage of the dry weight of calcium sulphate dihydrate and particulate material), and Portland cement B in the amount of 12.5 percent of the dry weight of calcium sulphate dihydrate and sand. The pumice had an open pore volume of 50 percent. The free water content of the mixture was 25 percent by weight total. After compression at a pressure of 125 kg/cm$^2$, the free water content, not including the water taken up by the pumice, was 4.5 percent by weight. After conditioning, the shaped product had a crushing strength of 119 kg/cm$^2$.

EXAMPLE III

The mixture of Example II was repeated, except all sand was replaced by pumice, and the free water content of the mixture was 35 percent by weight. After compression at a pressure of 125 kg/cm$^2$, the free water content, not including the water taken up by the pumice, was less than 5 percent by weight. After conditioning at 25° C. and a relative humidity of 95% for about 2 weeks, the free water content had not appreciably changed. The crushing strength of the shaped product was 114 kg/cm$^2$.

What is claimed is:

1. A method for the controlled manufacture of shaped products comprising the steps of forming a mixture of CaSO$_4$.2H$_2$O, a particulate inorganic material, cement and water and compressing said mixture to form shaped products, wherein said mixture contains hydraulic cement in an amount of between about 8 and 15 percent by weight of the combined dry weight of said CaSO$_4$.2H$_2$O and particulate inorganic silicious material, and from about 5 to 50 percent by weight water, and wherein said manufacture is controlled to obtain shaped products having a crushing strength within about 10 percent of the predetermined crushing strength D by selecting S and P in accordance with the formula:

$$D = 2.6 \times 10^3 (100-S)^{-1.2} \times P^{0.43}$$

wherein:
D is the predetermined crushing strength in kg/cm$^2$;
P is the pressure in kg/cm$^2$ applied to said mixture in forming said shaped article; and
S is the amount of said particulate inorganic silicious material in said mixture expressed as a percent by weight of the dry weight of CaSO$_4$.2H$_2$O and particulate inorganic silicious material present in said mixture and wherein S is between about 20 to 70 percent by weight and P is between about 50 and 500 kg/cm$^2$.

2. The method of claim 1 wherein S is between about 20 and 40 percent by weight and P is between about 50 and 100 kg/cm$^2$.

3. The method of claim 1 wherein said mixture contains said hydraulic cement in an amount of between about 10 and 13 percent by weight.

4. The method of claim 1 wherein said hydraulic cement is Portland cement.

5. The method of claim 1 wherein said particulate inorganic silicious material is sand, and the water content of said mixture before compression is no greater than 20 percent by weight.

6. The method of claim 5 wherein said sand has a grainsize up to about 4 mm and not more than 10 percent by weight of said sand is finer than 250 microns.

7. The method of claim 1 wherein at least a portion of said particulate inorganic silicious material is a porous silicious material having an open pore structure, and further wherein the water content of said mixture before compression is over 20 percent by weight.

8. The method of claim 7 wherein said porous material is selected from the group consisting of thermally expanded clay, expanded shale, expanded mica or pumice.

9. The method of claim 1, wherein said CaSO$_4$.2H$_2$O is wet gypsum from the chemical industry.

10. The method of claim 9, wherein said wet gypsum is a by-product in the preparation of phosphoric acid and the amount of particulate inorganic silicious material is so chosen that the shaped product has a radioactive radiation below safety standards required.

11. A process for the manufacture of shaped products comprising the steps of forming a mixture of CaSO$_4$.2H$_2$O, particulate inorganic silicious material, hydraulic cement and water and compressing said mixture at a pressure of between about 50 and 500 kg/cm$^2$ wherein said mixture essentially consists of CaSO$_4$.2H$_2$O, particulate inorganic silicious material selected from the group consisting of sand, porous material having an open pore structure, or combinations thereof, in an amount of between about 20 and 70 percent by weight and hydraulic cement in an amount of between about 8 and 15 percent by weight, all relative to the combined dry weight of said CaSO$_4$.2H$_2$O and said particulate inorganic material, and free water, not taken up by said porous material, in an amount sufficient to bind said cement but no greater than 20 percent of the combined dry weight of said CaSO$_4$.2H$_2$O, particulate inorganic material and cement.

12. A process for the manufacture of shaped products comprising the steps of forming a mixture of CaSO$_4$.2H$_2$O, sand, cement, and water and compressing said mixture at a pressure of between about 50 and 500 kg/cm$^2$ wherein said mixture essentially consists of CaSO$_4$.2H$_2$O, sand in an amount between about 20 and 70 percent by weight and hydraulic cement in an amount of between about 8 and 15 percent by weight, all relative to the combined dry weight of said CaSO$_4$.2H$_2$O and sand, and water in an amount sufficient to bind said cement but no greater than 20 percent of the combined dry weight of said CaSO$_4$.2H$_2$O, sand and cement.

13. Shaped products having a crushing strength of at least about 100 kg/cm$^2$ and consisting essentially of CaSO$_4$.2H$_2$O, particulate inorganic silicious material selected from the group consisting of sand, porous material having an open pore structure, or combinations thereof, in an amount of between about 20 and 70 percent by weight, cementstone in an amount of between 8 and 15 percent by weight (calculated as dry cement), all relative to the combined dry weight of said CaSO$_4$.2H$_2$O and said particulate inorganic material, and up to 6 percent free water not including the water taken up by the inorganic silicious material.

14. Shaped products having a crushing strength of at least about 100 kg/cm$^2$ and consisting essentially of CaSO$_4$.2H$_2$O, sand in an amount of between about 20 and 70 percent by weight, cementstone in an amount of between about 8 and 15 percent (calculated as dry cement), all relative to the combined dry weight of said CaSO$_4$.2H$_2$O and sand, up to 6 percent free water and additives not exeeding 5 percent based on the dry weight of the initial mixture.

* * * * *